Figure 1:
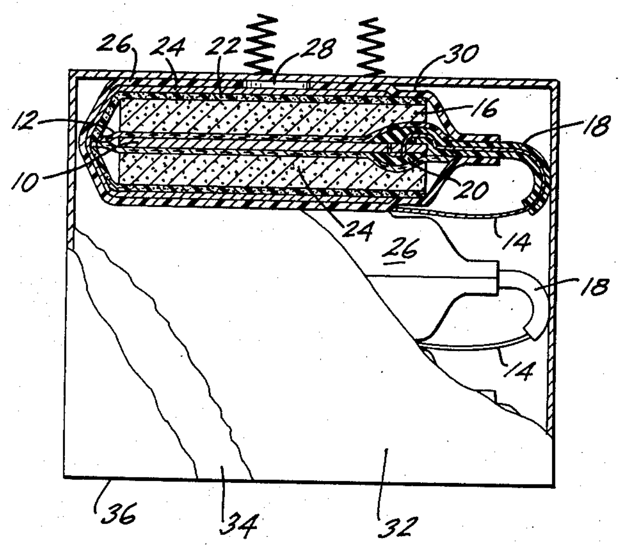

March 12, 1963 D. L. TODA ET AL 3,081,371

VENTING SYSTEM FOR MAGNESIUM CATHODIC ENVELOPE CELLS

Filed May 19, 1960

INVENTORS
DEAN L. TODA
WILLIAM H. DEIERHOI, JR.

BY Robert C. Cummings
ATTORNEY

United States Patent Office 3,081,371

Patented Mar. 12, 1963

3,081,371
VENTING SYSTEM FOR MAGNESIUM CATHODIC ENVELOPE CELLS

Dean L. Toda, Bellaire, Tex., and William H. Deierhoi, Jr., Westlake, Ohio, assignors to Union Carbide Corporation, a corporation of New York Filed May 19, 1960, Ser. No. 30,320
2 Claims. (Cl. 136—111)

This invention relates to means for venting a galvanic cell, and more particularly, to venting flat type galvanic cells of the type which have been referred to as cathodic envelope cells.

Excellent batteries for use in modern electronic equipment are batteries made from the cathodic envelope unit cells which have been developed recently. In such cells is embodied a new concept in a flat primary Le Clanche cell which is particularly well suited for heavy drain and low temperature service. A cathodic envelope cell comprises essentially a consumable metal anode, which is covered with a bibulous separator, an electrolyte wet depolarizer mix disposed on each side of the covered metal anode, a conductive plastic film cathode collector in contact with the depolarizer mix and a layer of metal foil in contact with the other side of the cathode collector, the whole cell being enveloped with a non-conductive, moisture impervious film and sealed tight at its edges. A positive terminal is provided by exposing through a part of the non-conductive film envelope on at least one side of the cell, a portion of the metal foil adjacent the cathode collector film. A lead-out wire connected at one end to the metal anode constitutes the negative terminal of the cell.

An electrochemical system for the production of electricity which has been used in cathodic envelope cells is one which comprises a magnesium anode, manganese dioxide depolarizer and magnesium bromide electrolyte. Unfortunately, the chemistry of this system is such that relatively large quantities of hydrogen are given off as the cell is discharged. Unless this gas is removed from the cell envelope, the electrical contact in and between cells in a battery will become erratic and result in an intermittent closed circuit voltage. Under heavy discharge conditions, gasing may be so severe as to seriously penalize performance or even rupture the plastic envelope that encloses the cell.

Various means for venting the generated gas have been suggested by the art but unfortunately all have proven unsatisfactory. For example, various plastic jacket materials which were permeable to gas were investigated. To date, no material which is compatible with the system and which also possesses sufficient permeability has been found. A system for incorporating a thread through the sealed edges of the plastic envelope to act as a gas vent has been proposed, but it is unsuitable due to the mechanical complexities involved. The obvious solution of punching a small hole in the plastic envelope to release gas is complicated by the presence of liquid electrolyte in the cell. Leakage of electrolyte from the cell can, of course, cause inter-cell short circuiting, or polarization of a metal battery container, and in addition, leaked electrolyte is unavailable for cell reaction.

The principal object of the invention is to provide means for venting generated gases from magnesium cathodic envelope cells which avoid the undesirable a accompaniments outlines above.

The object of the invention is accomplished by an improved structure for a cathodic envelope cell wherein said envelope is ventilated by one or more properly placed small vent holes and a highly bibulous separator is incorporated within the cell. In addition, when the cells of the invention are stacked to form a battery, the battery is preferably wrapped in a sheet of absorbent kraft paper which has a waterproof layer, suitably of polyethylene, on the side away from the cells.

Figure 2:
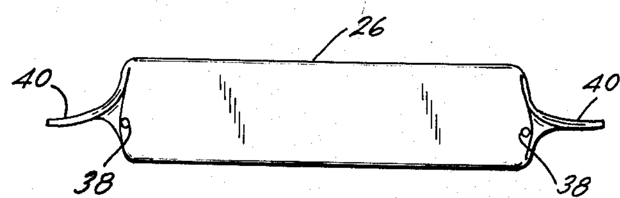

The invention will be more readily understood by reference to the accompanying drawing wherein:

FIG. 1 is a side elevation, partially in section, of a battery of cells which embody the principles of the invention; and FIG. 2 is an end view of one of the cells of FIG. 1 which clearly shows th preferred position of the venting apertures.

Referring now to the drawing, a cell made in accordance with this invention is there shown. It comprises a magnesium anode 10 which is wrapped in a highly bibulous separator 12, the anode 10 having an electrical lead 14 attached thereto. On both sides of the separator wrapped anode 10, a mix cake 16 of magnesium bromide electrolyte-wet manganese dioxide cathode-depolarizer mix is disposed. The lead 14 is provided with electrical insulation 18 and a sealing material 20 is provided over the lead 14 where it is attached to the anode 10 and the separator 12 forms a barrier between the lead 14 and the mix cakes 16. The three sides of this unit which are free of the terminal lead 14 are covered with a cathode collector 22. A conductive foil 24 is provided adjacent the cathode collector 22. A ventilated wrapping film 26 forms the outer envelope for the cell and completely encloses it, the marginal portions of the film being sealed to prevent electrolyte leakage, preferably by means of a heat seal about the periphery of the cell. The film layer 26 is provided with an aperture 28 through which contact may be made to the foil 24. Leakage of electrolyte from the aperture 28 is prevented by a heat seal between the cathode collector 22 and the wrapping film 26 along mating surfaces 30. The insulated electrical lead 14 protrudes from the seal as shown, and is folded under the cell during stacking where it contacts the foil 24 of the adjacent cell thereby connecting them in series. As shown, the stack of cells is preferably wrapped in a sheet of absorbent kraft paper 32 which is provided with a waterproof layer of polyethylene 34, when it is placed in battery container 36.

As shown in FIG. 2, small venting apertures 38 are provided in the film layer 26 only, preferably at a point near the sealed joint 40 to release the gas which accumulates on discharge. The proper placing of the venting apertures 38 in the cell envelope 26 aids in preventing the escape of electrolyte.

Suitable for use as the highly bibulous separator which tends to confine the electrolyte so it is not available to leak out through the vents, is 6 to 12 mil thick porous kraft sheet separator stock. The preferred 7 mil thick porous kraft paper is capable of retaining 2.6 to 2.9 times its dry weight of water. Any possible disadvantageous effect due to leakage of electrolyte is further neutralized by the absorbent outer layer of waterproofed kraft paper.

Improvement in the voltage characteristics on heavy discharge of magnesium cathodic envelope cells which incorporate the features of the invention over these which do not is clearly shown in the table below:

| | Three Cell Battery Discharge Continuously at 667 ma. Starting Drain | |
|---|---|---|
| | Hrs. to 1.1 v./cell | Hrs. to .9 v./cell |
| Not Vented | .5 | 1 |
| Vented | 7 | 13 |

In addition, the battery of cells of the prior art had extremely erratic closed circuit voltage stability when compared to the battery of cells of the invention.

We claim:

1. In combination in a substantially flat dry cell, a magnesium anode wrapped in a bibulous separator made of a porous kraft paper having a thickness in the range of from 6 mils to 12 mils, a magnesium bromide-wet manganese dioxide cathode depolarizer disposed on both sides of said separator wrapped anode and an envelope enclosing said cell, the marginal edges of said cell being sealed together to prevent electrolyte leakage, said cell being ventilated by at least one venting aperture which is located at a point near said sealed marginal edges of said envelope which encloses said cell.

2. A battery consisting of a plurality of the type cell defined in claim 1 wherein said cells are wrapped in a layer of kraft paper which has an external coating of polyethylene.

References Cited in the file of this patent

UNITED STATES PATENTS

| | | |
|---|---|---|
| 2,547,907 | Fry et al. | Apr. 3, 1951 |
| 2,601,267 | Ellis | June 24, 1952 |
| 2,699,460 | Blake | Jan. 11, 1955 |
| 2,790,022 | Glesner | Apr. 22, 1957 |
| 2,798,895 | Nowotny | July 9, 1957 |
| 2,807,658 | Hatfield | Sept. 24, 1957 |
| 2,847,495 | Nagorski | Aug. 12, 1958 |
| 2,870,235 | Soltis | Jan. 20, 1959 |